US007421448B2

(12) United States Patent
Spork

(10) Patent No.: US 7,421,448 B2
(45) Date of Patent: Sep. 2, 2008

(54) SYSTEM AND METHOD FOR MANAGING WEB CONTENT BY USING ANNOTATION TAGS

(75) Inventor: Murray Leo Spork, Teneriffe (AU)

(73) Assignee: SAP AG, Walldorf (DE)

( * ) Notice: Subject to any disclaimer, the term of this patent is extended or adjusted under 35 U.S.C. 154(b) by 340 days.

(21) Appl. No.: 11/018,110

(22) Filed: Dec. 20, 2004

(65) Prior Publication Data

US 2006/0168125 A1 Jul. 27, 2006

(51) Int. Cl.
*G06F 17/00* (2006.01)
(52) U.S. Cl. .................. 707/102; 707/104.1; 715/230
(58) Field of Classification Search ......... 707/101–102, 707/104.1; 715/501.1, 205, 230
See application file for complete search history.

(56) References Cited

U.S. PATENT DOCUMENTS

| 6,721,921 | B1 * | 4/2004 | Altman ............... 715/210 |
| 7,162,691 | B1 * | 1/2007 | Chatterjee et al. ........... 715/205 |
| 2003/0061200 | A1 * | 3/2003 | Hubert et al. ................. 707/3 |
| 2003/0085997 | A1 * | 5/2003 | Takagi et al. ................ 348/143 |
| 2003/0110503 | A1 * | 6/2003 | Perkes ......................... 725/86 |
| 2004/0143796 | A1 * | 7/2004 | Lerner et al. ................ 715/538 |
| 2005/0160355 | A1 * | 7/2005 | Cragun et al. ............... 715/512 |
| 2005/0216457 | A1 * | 9/2005 | Walther et al. ................ 707/4 |
| 2006/0075205 | A1 * | 4/2006 | Martin et al. ............... 711/200 |
| 2006/0150079 | A1 * | 7/2006 | Albornoz et al. ............ 715/512 |

FOREIGN PATENT DOCUMENTS

| EP | 1205859 A2 | 5/2002 |
| EP | 1320038 A2 | 6/2003 |

OTHER PUBLICATIONS

Kahan et al, "Annotea: an open RDF infrastructure for shared Web annotations" Computer Networks 39 (2002), pp. 589-608.*
Vasudevan et al, "On Web annotations: promises and pitfalls of current Web infrastructure" IEEE 1999, pp. 1-9.*
Peters, R., et al., "CrystalWeb—A Distributed Authoring Environment for the World-Wide Web", *Computer Networks and ISDN Systems*, vol. 27(6), North Holland Publishing,(Apr. 1995),861-870.
Roscheisen, M., et al., "Beyond Browsing: Shared Comments, SOAPs, Trails and On-Line Communities", *Computer Networks and ISDN Systems*, 27(6), North Holland Publishing,(Apr. 1995),739-749.

* cited by examiner

*Primary Examiner*—Uyen T. Le
(74) *Attorney, Agent, or Firm*—Schwegman, Lundberg & Woessner, P.A.

(57) ABSTRACT

A system and method for managing web content are described herein. In one embodiment, the method includes receiving a request to store content of a webpage, where the webpage includes an annotation tag. In one embodiment, the annotation tag indicates that the content includes an annotation. The method also includes associating a first set of metadata with the annotation tag, storing the content, and storing the first set of metadata, wherein the first set of metadata can be accessed without accessing the content.

15 Claims, 9 Drawing Sheets

SYSTEM AND METHOD FOR MANAGING WEB CONTENT BY USING ANNOTATION TAGS

BACKGROUND

1. Field

This invention relates generally to the field of data processing and more particularly to the field of web content management systems.

2. Description of Related Art

Over the past few years, simple web content management systems (CMS) have emerged, making it easy for unskilled users to enter and update online content. One such CMS, invented by Ward Cunningham, is called a Wiki. Cunningham described Wiki as "the simplest online database that could possibly work." Wiki provides a very easy way for people to collaborate and contribute information to a web site. The Wiki system uses wiki-text syntax to simplify the process of adding HTML to web pages. For example, wiki-text makes it relatively easy for unskilled users to add headers, bullet points, and internal and external hyperlinks to web pages.

Wiki engines typically store web pages as raw wiki-text. When a user requests a web page in "view mode," the wiki engine renders the wiki-text into HTML, allowing easy browsing and viewing. Wiki engines can also present wiki-text in "edit mode," where the raw wiki-text content of a web page is shown in a standard Web Form, allowing for easily web content editing and saving.

Weblogs (or blog for short) are another type of CMS. Blogs are typically online personal journals in which entries appear in reverse chronological order. The blog owner periodically creates journal entries that appear as content in the blog. Recently, hybrid CMSs have emerged having functionality of both blogs and wikis. These hybrids have been named blikis.

CMS users often insert "to do" items into web page text. "To do" items often relate to developing content within a web page and indicate that a CMS user should complete a specified task. For example, users may insert "to do" items to signify that a web page should be updated with particular information. As another example, users may insert "to do" items because a discussion within the web page has led to a need for some follow-up activity.

"To do" items can be represented by a unique character string followed by text specifying a task to be performed. For example, a "to do" item can be represented as:

TODO: We should do some follow up investigation on this idea of "serendipitous discovery."

By choosing a character string that is a unique sequence of characters (like "TODO:"), a CMS can find "to do" items by searching through web page content for the character strings.

Finding "to do" items in the web content can be cumbersome because CMSs typically scan through text of each web page when searching for "to do" items. Furthermore, CMSs do not provide ways for creating automated reminders for "to do" items. Also CMSs do not typically "track" whether a user has performed tasks specified in the "to do" items. For example, CMSs do not typically record information relating to follow-up activity associated with "to do" items.

SUMMARY

A system and method for managing web content are described herein. In one embodiment, the method includes receiving a request to store content of a webpage, where the webpage includes an annotation tag. In one embodiment, the annotation tag indicates that the content includes an annotation. The method also includes associating a first set of metadata with the annotation tag, storing the content, and storing the first set of metadata, wherein the first set of metadata can be accessed without accessing the content.

In one embodiment, the system includes a content management system (CMS) to receive webpage content from a webpage content editor, where the webpage content includes an annotation tag. In one embodiment, the CMS is for creating metadata based on the annotation tag. The system also includes a data store to store the webpage content and the metadata, where the metadata can be retrieved without searching the webpage content.

BRIEF DESCRIPTION OF THE FIGURES

The present invention is illustrated by way of example and not limitation in the Figures of the accompanying drawings in which.

DESCRIPTION OF THE EMBODIMENTS

A system and method for managing web content are described herein. This description of the embodiments is divided into four sections. The first section describes an overview, while the second section describes an exemplary operating environment and system architecture. The third section describes exemplary operations and the fourth section provides some general comments.

Overview

This section provides a broad overview of a system for managing web content. In particular, this section describes a system for creating and storing metadata associated with web page annotation items, according to exemplary embodiments of the invention.

Figure 1:
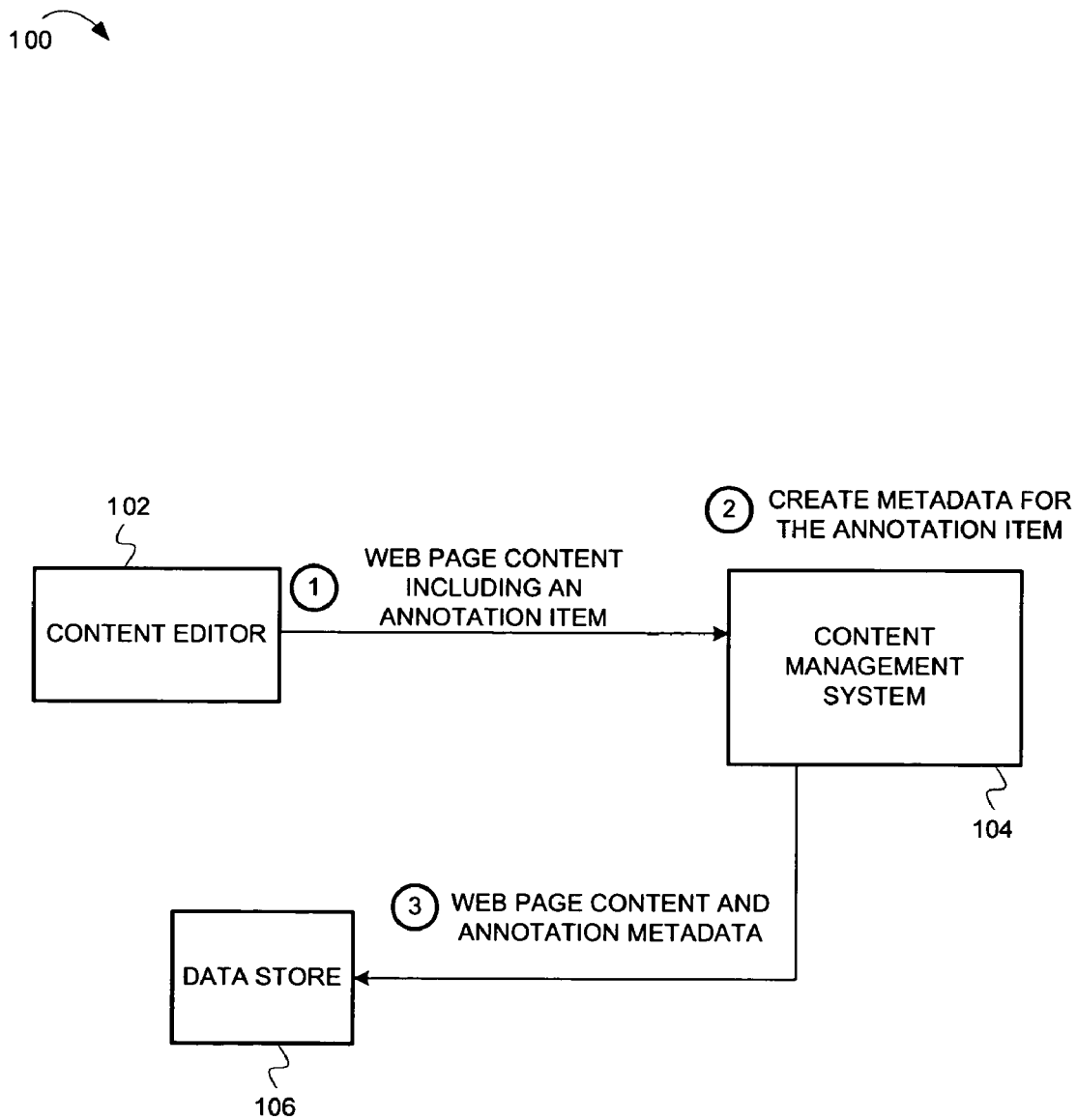
FIG. 1 is a dataflow diagram illustrating data flow attendant to creating metadata associated with web page annotation items, according to exemplary embodiments of the invention.

FIG. 1 is a dataflow diagram illustrating data flow attendant to creating metadata associated with web page annotation items, according to exemplary embodiments of the invention. The dataflow of FIG. 1 is divided into three stages.

At stage 1, a content editor 102 transmits web page content to a content management system (CMS) 104. The web page content includes an annotation item, which can include a character string included in the web page content. The annotation item can specify tasks to be accomplished and a deadline for accomplishing the tasks.

At stage 2, the CMS 104 creates annotation metadata based on the annotation item. The annotation metadata can include information about a task that should be accomplished, information about when the task should be accomplished, information about a user who inserted the associated annotation item, etc.

At stage 3, the CMS 104 stores the annotation metadata and the web page content in a data store 106. The annotation metadata and web page content are stored in a manner that allows the CMS 104 to search and retrieve the annotation metadata without searching through the web page content. In one embodiment, the CMS 104 can search the annotation metadata and retrieve web page content based on the metadata search results.

Hardware, Operating Environment, and System Architecture

This section describes an exemplary system architecture and some exemplary hardware with which embodiments of the invention can be practiced. Operations of the system components will be described in the next section.

Exemplary System Architecture

Figure 2:
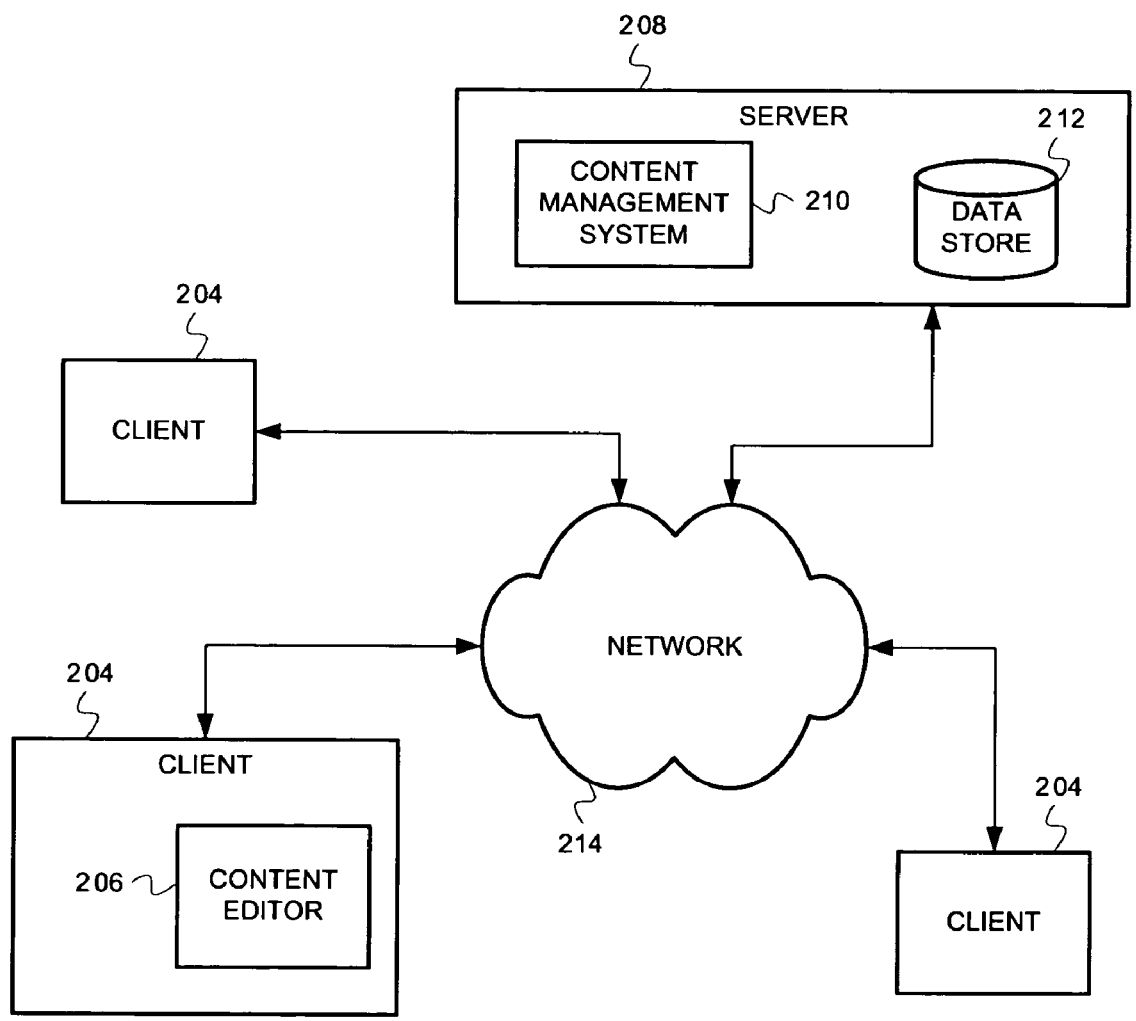
FIG. 2 is a block diagram illustrating a network in which a content management system can store and retrieve metadata associated with web page annotation items, according to exemplary embodiments of the invention.

FIG. 2 is a block diagram illustrating a network in which a content management system can store and retrieve metadata associated with web page annotation items, according to exemplary embodiments of the invention. As shown in FIG. 2, according to one embodiment, multiple clients 204 can be connected to a server 208 via a network 214. The network 214 may include a local area network (LAN), a wide area network (WAN), a telephone network, such as the Public Switched Telephone Network (PSTN), an intranet, the Internet, or a combination of networks. Although FIG. 2 shows three client devices 204 and one server 208, the system 200 can include any number of clients 204 and servers 208. Also, in some instances, a client 204 may perform the functions of a server 208 and a server 208 may perform the functions of a client 204.

The clients 204 can be any suitable devices, such as mainframes, minicomputers, personal computers, laptops, personal digital assistants, or the like. The clients 204 may transmit and/or receive data over the network 214 via wired, wireless, or optical connections.

The client 204 includes a content editor 206 (e.g., a web browser). The content editor 206 can facilitate web content editing. For example, the content editor 206 can enable a user to include annotations items within web content. For example, the content editor 206 can enable a user to add annotations "inline" in a web page. The content editor 206 can transmit edited web content to the content management system 210 for storage in the data store 212.

The server 208 includes a content management system (CMS) 210 and a data store 212. The CMS 210 can receive and process client requests for web content and/or metadata, while the data store 212 can store the web content and metadata. In one embodiment, the data store 212 can store the web content in a manner in which the CMS 208 can search the metadata without accessing the web content. In one embodiment, the web content includes annotation items and the metadata includes information associated with the annotation items.

Figure 3:
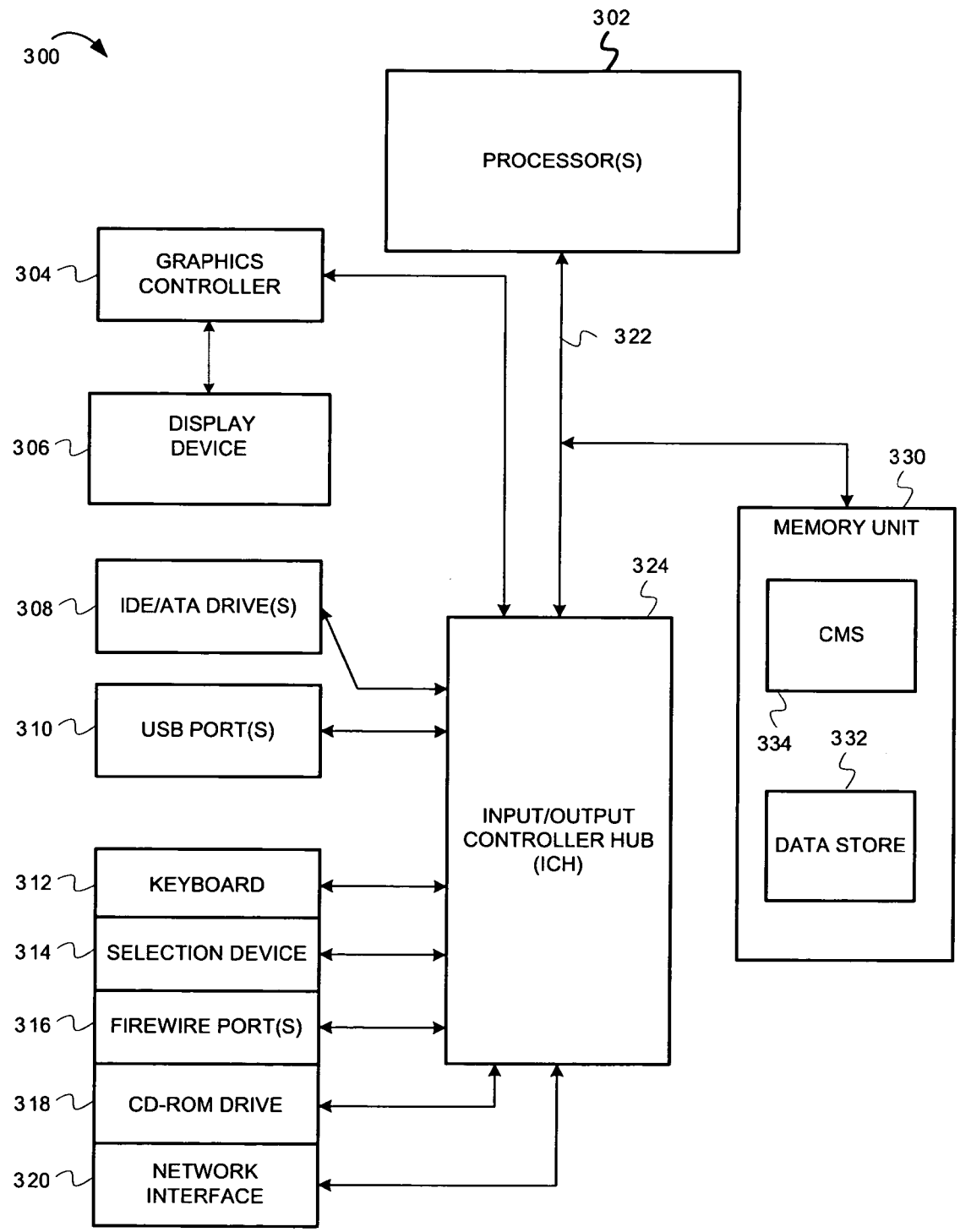
FIG. 3 is a block diagram illustrating an exemplary computer system used in conjunction with certain embodiments of the invention.

While the discussion of FIG. 2 describes a network including clients and servers, the discussion of FIG. 3 describes an exemplary computer system that can be used in conjunction with embodiments of the invention. For example, the computer system can be used as a client 204 or server 208.

FIG. 3 is a block diagram illustrating an exemplary computer system used in conjunction with certain embodiments of the invention. As illustrated in FIG. 3, computer system 300 comprises processor(s) 302. The computer system 300 also includes a memory unit 330, processor bus 322, and Input/Output controller hub (ICH) 324. The processor(s) 302, memory unit 330, and ICH 324 are coupled to the processor bus 322. The processor(s) 302 may comprise any suitable processor architecture. The computer system 300 may comprise one, two, three, or more processors, any of which may execute a set of instructions in accordance with embodiments of the present invention.

The memory unit 330 includes a data store 332 and content management system 334. Although not shown in FIG. 3, the memory unit 330 can include a content editor (see block 206 of FIG. 2). The memory unit 330 stores data and/or instructions, and may comprise any suitable memory, such as a dynamic random access memory (DRAM), for example. The computer system 300 also includes IDE drive(s) 308 and/or other suitable storage devices. A graphics controller 304 controls the display of information on a display device 306, according to embodiments of the invention.

The input/output controller hub (ICH) 324 provides an interface to I/O devices or peripheral components for the computer system 300. The ICH 324 may comprise any suitable interface controller to provide for any suitable communication link to the processor(s) 302, memory unit 330 and/or to any suitable device or component in communication with the ICH 324. For one embodiment of the invention, the ICH 324 provides suitable arbitration and buffering for each interface.

For one embodiment of the invention, the ICH 324 provides an interface to one or more suitable integrated drive electronics (IDE) drives 308, such as a hard disk drive (HDD), or to suitable universal serial bus (USB) devices through one or more USB ports 310. For one embodiment, the ICH 324 also provides an interface to a keyboard 312, a mouse 314, a CD-ROM drive 318, and one or more suitable devices through one or more firewire ports 316. For one embodiment of the invention, the ICH 324 also provides a network interface 320 though which the computer system 300 can communicate with other computers and/or devices (e.g., clients 204 and servers 208).

In one embodiment, the computer system 300 includes a machine-readable medium that stores a set of instructions embodying any one, or all, of the methodologies for managing web content. Machine-readable media includes any mechanism that provides (i.e., stores and/or transmits) information in a form readable by a machine (e.g., a computer). For example, a machine-readable medium includes read only memory (ROM), random access memory (RAM), magnetic disk storage media, optical storage media, and flash memory devices. According to embodiments of the invention, the computer system 300 can include other types of logic (e.g., digital logic) for executing the operations described herein. Furthermore, software can reside, completely or at least partially, within memory unit 330 and/or within the processor(s) 302.

System Operations

This section describes operations performed by embodiments of the invention. In certain embodiments, the operations are performed by instructions residing on machine-readable media (e.g., software), while in other embodiments, the operations are performed by hardware or other logic (e.g., digital logic).

In this section, FIGS. 4-9 will be discussed. The discussion begins by describing operations for storing and updating web pages and it continues with a description of web content and metadata.

Figure 4:
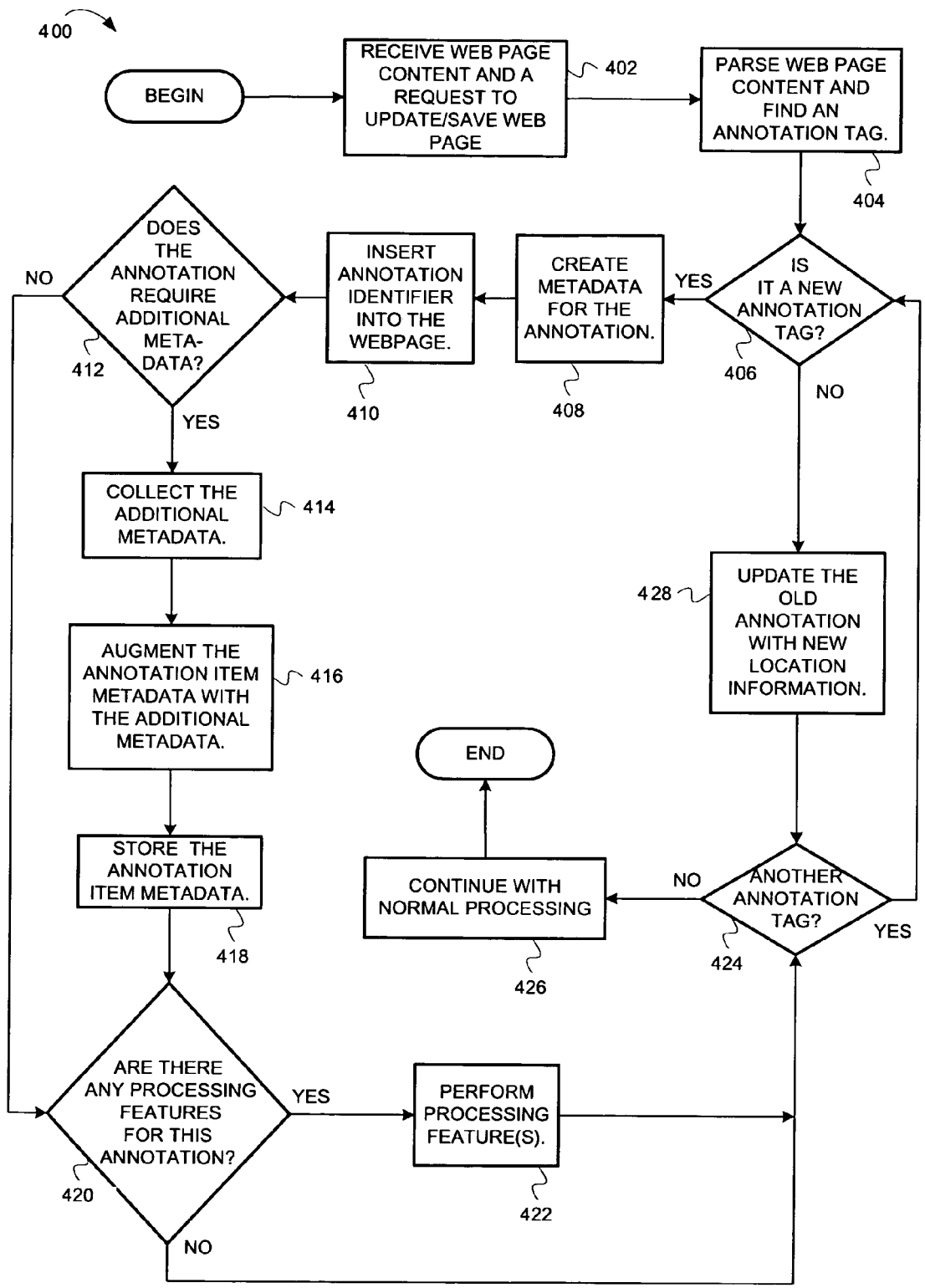
FIG. 4 is a flow diagram illustrating operations for processing web content requests, according to exemplary embodiments of the invention.

FIG. 4 is a flow diagram illustrating operations for processing web content requests, according to exemplary embodiments of the invention. The flow diagram 400 will be described with reference to the exemplary system shown in FIG. 2. The flow diagram 400 commences at block 402.

At block 402, the CMS 210 receives web page content and a request to update a web page. The request can be received from the content editor 206. The web page content can include images, audio, HTML code, text, or any other suitable content. In one embodiment, the web page content includes an annotation item. The flow continues at block 404.

Figure 5:
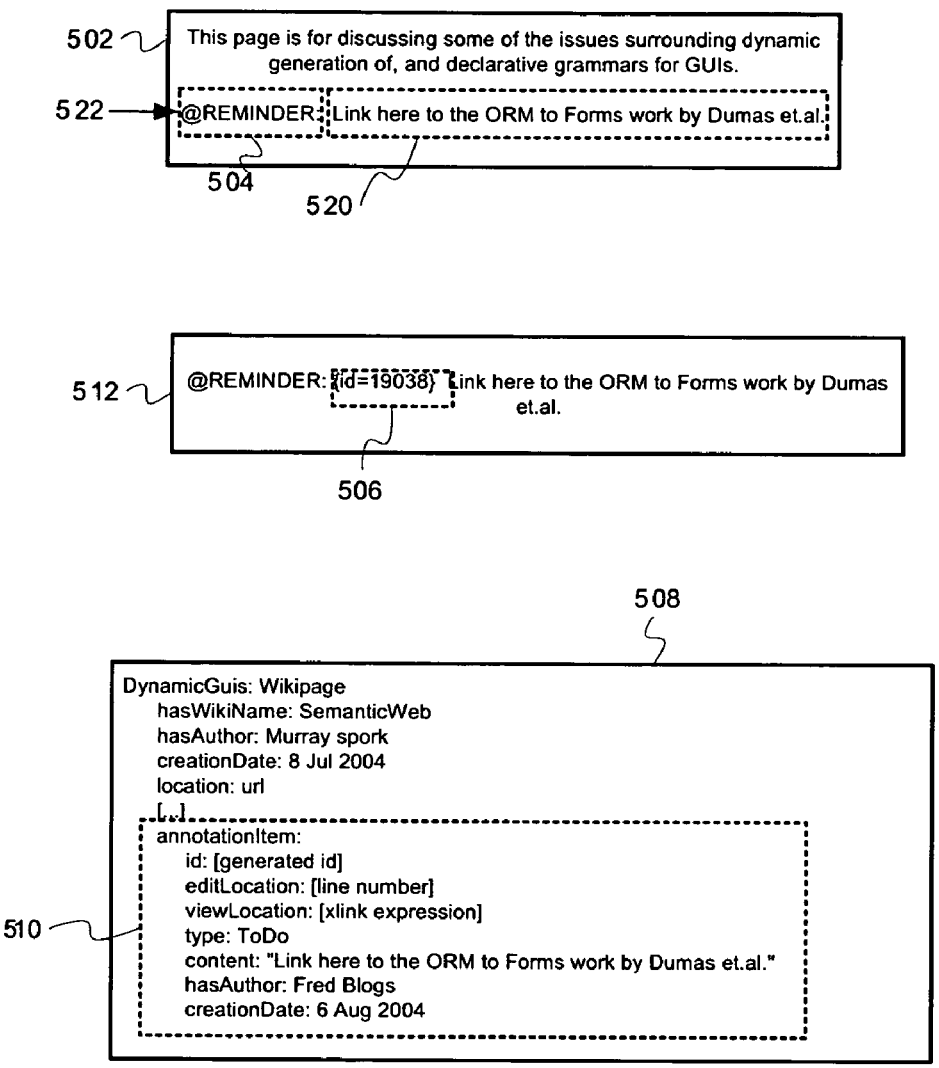
FIG. 5 is a block diagram illustrating web page content and metadata, according to exemplary embodiments of the invention.

At block 404, the CMS 210 parses the web page content and finds an annotation tag. FIG. 5 helps illustrate this concept.

FIG. 5 is a block diagram illustrating web page content and metadata, according to exemplary embodiments of the invention. FIG. 5 shows a web page content segment 502, which includes an annotation item 522. The annotation item 522 includes an annotation tag 504 and an annotation 520. In one embodiment, the annotation tag can be a relatively unique character string. For example, the annotation tag 504 is a character string beginning with "@" and ending with ":". Because annotation tags are relatively unique character strings, the CMS 210 can distinguish them from other web content 502. Therefore, the CMS 210 can find an annotation item's annotation tag when parsing through web page content (see block 404 of FIG. 4).

Referring back to the flow 400 of FIG. 4. The flow continues at block 406.

At block 406, the CMS 210 determines whether the annotation tag is a new annotation tag. FIG. 5 helps illustrate this concept. In FIG. 5, an annotation item 512 includes an annotation identifier 506. In one embodiment, the CMS 210 uses annotation identifiers to distinguish between new and old annotation tags.

Referring back to block 406 of FIG. 4, if the annotation tag is new, the flow continues at block 408. Otherwise, the flow continues at block 428.

At block 408, the CMS 210 creates metadata based on the annotation item. For example, the CMS 210 can create metadata representing a task to be performed, a task performance deadline, or other information about the annotation item. FIG. 5 shows an exemplary set of metadata created by the CMS 210.

In particular, FIG. 5 shows a metadata segment 508, which includes annotation metadata 510. The annotation metadata 510 can be based on web content in which an annotation item resides. The annotation metadata 510 can also be based on an annotation item itself. In one embodiment, the annotation metadata can be derived from an annotation item's location within a web page (i.e., spatial context), a time when the annotation item was added or updated (i.e., temporal context), a type associated with the annotation tag, content of the annotation (e.g., see annotation 520), and the user who added the annotation item. While the annotation metadata 510 can be represented in the format as shown in FIG. 5, other embodiments call for any other suitable metadata formats.

Referring back to the flow 400 of FIG. 4, the flow continues at block 410.

At block 410, the CMS 210 inserts an annotation identifier into the web page content. FIG. 5 helps illustrate this concept. In FIG. 5, annotation item 512 includes an annotation identifier 506. In one embodiment, during the operation at block 410 of FIG. 4, the CMS 210 can insert an annotation identifier 506 between an annotation tag 504 and an annotation 520. The annotation identifier 506 can be used for uniquely identifying annotation items and indicating that annotation items have already been processed by the CMS 210. Other embodiments can employ other techniques for uniquely identifying annotation items.

Referring back to the flow 400 of FIG. 4. The flow continues at block 412.

At block 412, the CMS 210 determines whether the annotation item requires additional metadata. In one embodiment, when the annotation (e.g., see annotation 520 of FIG. 5) indicates that a task is to be performed, the CMS 210 requires additional metadata to represent a task deadline. In one embodiment, the CMS 210 requires additional metadata for web page links relevant to discussions in a web page. If additional metadata is required, the flow continues at block 414. Otherwise, the flow continues at block 420.

At block 414, the CMS 210 creates additional metadata. In one embodiment, the CMS 210 can prompt a user to enter information (e.g., a task deadline, URL, etc.) through a user interface. The CMS 210 can create additional metadata based on the user information. In one embodiment, the CMS 210 can create additional metadata based on information received from the data store 212 or other computer. The flow continues at block 416.

At block 416, the CMS 210 augments the annotation item metadata with the additional metadata. The flow continues at block 418.

At block 418, the CMS 210 stores the augmented annotation item metadata in the data store 212. In one embodiment, the CMS 210 stores the annotation item metadata such that the CMS 210 can search the annotation item metadata without accessing web page content. For example, the CMS 210 can store the annotation item metadata in a database table separate from any web content. The flow continues at block 420.

At block 420, the CMS 210 determines whether there are any processing features for the annotation. If there are additional processing features, the flow continues at block 422. Otherwise, the flow continues at block 424.

At block 422, the CMS 210 performs processing features associated with the annotation. In one embodiment, the processing features can include inserting a task item in a user's office calendar program, where the task item serves to remind the user about the annotation. In another embodiment, the processing features include transmitting email or other messages to a user. The flow continues at block 424.

At block 424, the CMS 210 determines whether there is another annotation tag in the web page content. If there is another annotation tag in the web page content, the flow continues at block 406. Otherwise, the flow continues at block 426.

At block 426, the CMS 210 continues normal processing. For example, the CMS 210 performs non-annotation-item-related operations on the web page content. From block 426, the flow ends.

At block 428, the CMS 210 updates old annotation item location information with new location information. In one embodiment, when the CMS 210 creates metadata for an annotation item (see block 408), it may create metadata that indicates the annotation item's position in the web content and/or in a content view. If the annotation item resides at a location other than that indicated in the annotation item's metadata, the CMS 210 updates the metadata to indicate the annotation item's new location. The flow continues at block 424.

Figure 6:
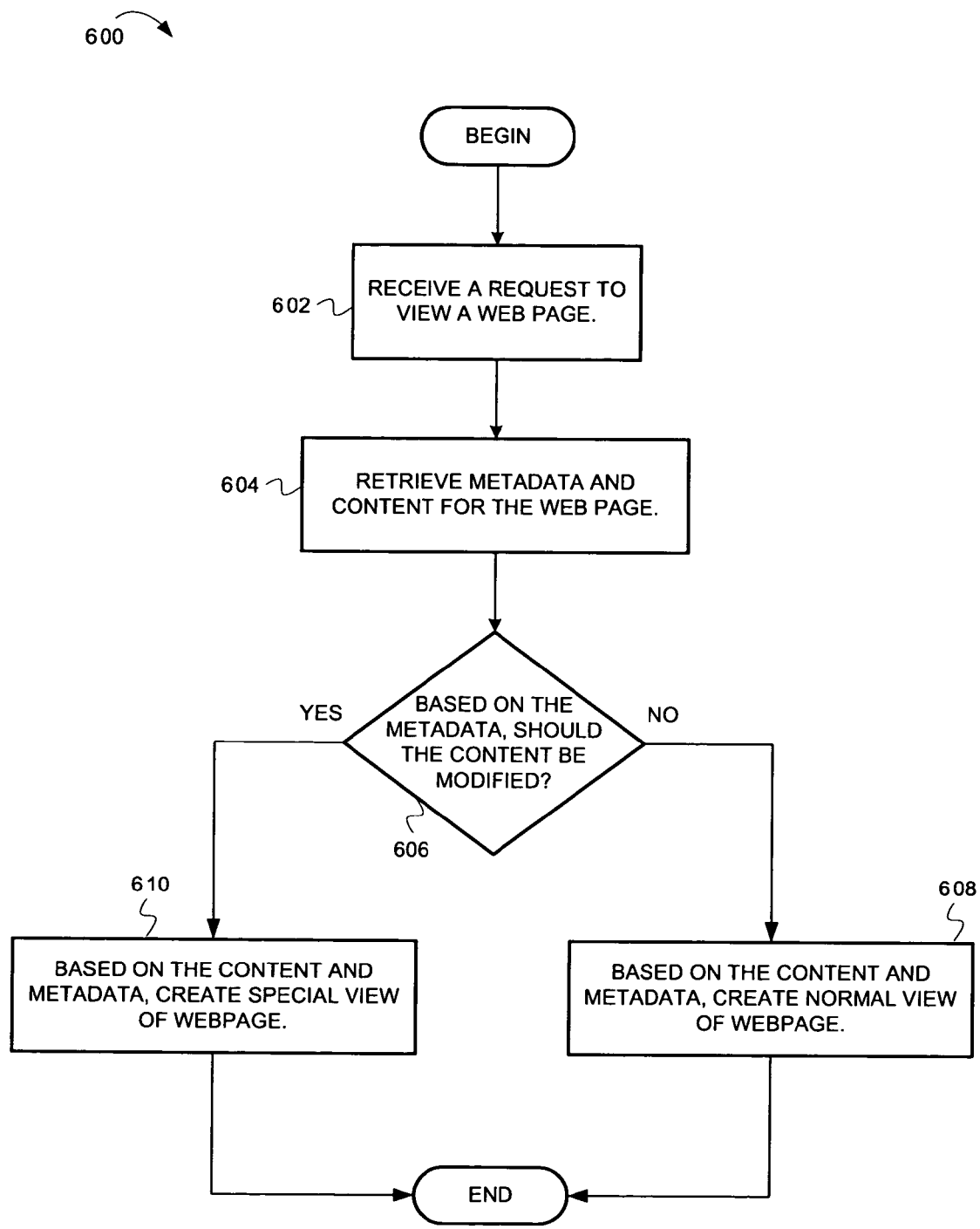
FIG. 6 is a flow diagram illustrating operations for processing web content requests, according to exemplary embodiments of the invention.

While FIGS. 4 and 5 describe operations for processing annotation items and web content, FIG. 6 describes processing requests for web content.

FIG. 6 is a flow diagram illustrating operations for processing web content requests, according to exemplary embodiments of the invention. The flow diagram 600 will be described with reference to the exemplary system shown in FIG. 2. The operations of the flow diagram 600 will also be described with reference to FIG. 5. The flow diagram 600 commences at block 602.

At block 602, the content management system (CMS) 200 receives a request for a web page. The CMS 210 can receive the request from a content editor 206. The flow continues at block 604.

At block 604, the content management system 210 retrieves from the data store 212 the web page and metadata associated with the webpage. In one embodiment, the web page includes an annotation item that is associated with the metadata. In one embodiment, the metadata can specify a task to be performed and a deadline for performing the task. The flow continues at block 606.

At block 606, based on the metadata, the CMS 210 determines whether to modify the web page. In one embodiment, the CMS 210 can determine whether to modify the web page based on a task performance deadline represented in the metadata. For example, if the task performance deadline has passed, the CMS 210 can modify the web page to include a visual indication of the passed deadline. If the task performance deadline has not passed, the CMS 210 may not modify the web page. If the CMS 210 will modify the content, the flow continues at block 610. Otherwise, the flow continues at block 608.

At block 608, based on the metadata and web page content, the CMS 210 creates a normal view of the web page. For example, the CMS 210 creates HTML code representing a normal view of the requested web page. From block 608, the flow ends.

At block 610, based on the metadata and web page content, the CMS 210 creates a special view of the web page. For example, the CMS 210 creates HTML code representing a special view of the requested web page. For example, the special view can include a visual indicator to show that a task deadline has passed (see discussion of block 606). From block 610, the flow ends.

In the discussion above, FIGS. 4 and 6 mainly described operations performed by a CMS. In the discussion below, FIG. 7 will mainly describe operations performed by a data store.

Figure 7:
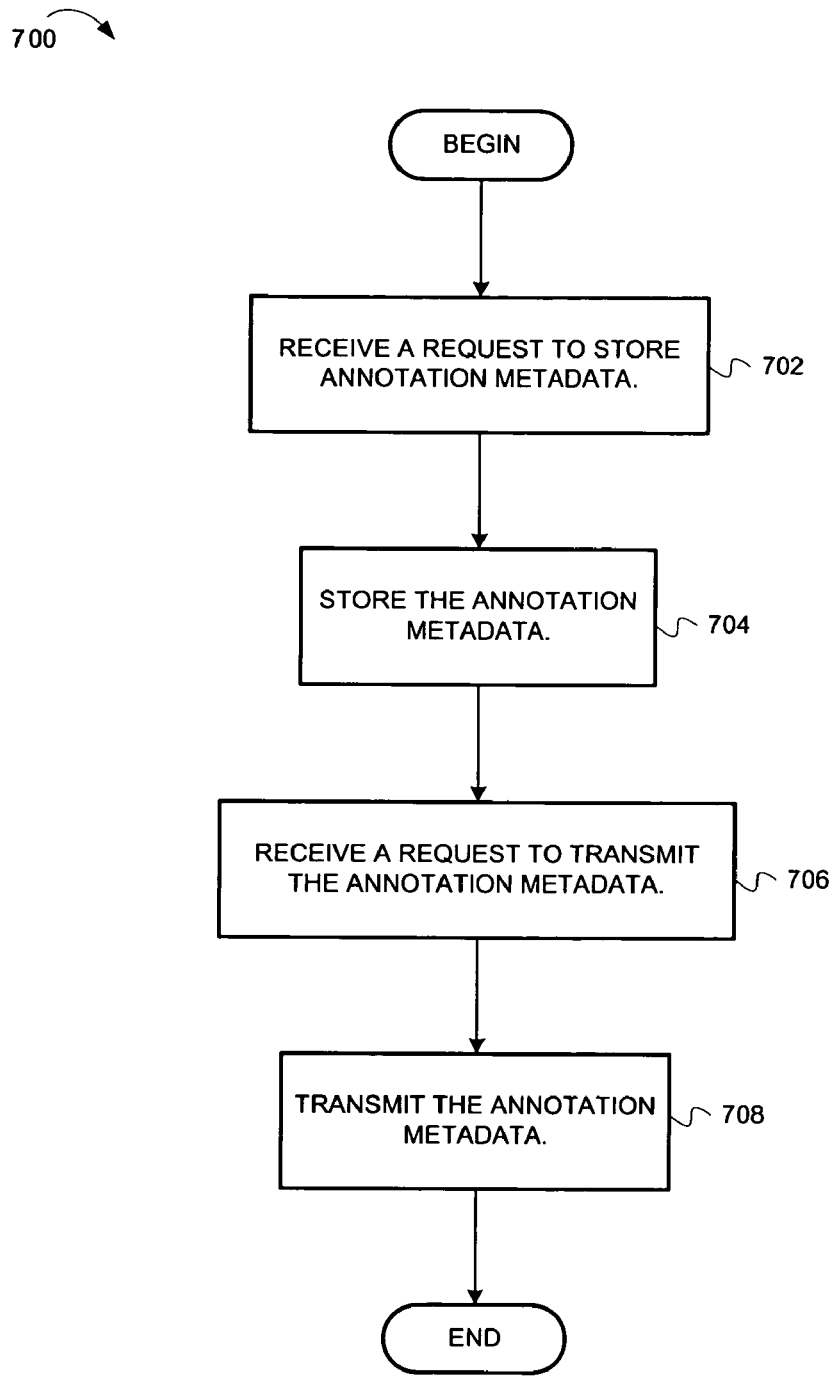
FIG. 7 is a flow diagram illustrating operations for receiving and transmitting annotation metadata, according to exemplary embodiments of the invention.

FIG. 7 is a flow diagram illustrating operations for receiving and transmitting annotation metadata, according to exemplary embodiments of the invention. The operations of the flow diagram 700 will be described with reference to the exemplary system of FIG. 2. The flow diagram 700 commences at block 702.

At block 702, the data store 212 receives a request to store annotation item metadata. In one embodiment, the request is received from a content editor 206. In one embodiment, the annotation item metadata can be that shown in FIG. 5 (see 510). The flow continues at block 704.

At block 704, the data store 212 stores the annotation item metadata. In one embodiment, the data store 212 stores the annotation item metadata in tables of a relational database. In another embodiment, the data store 212 stores the annotation item metadata and a flat file database. The flow continues at block 706.

At block 706, the data store 212 receives a request to transmit the annotation item metadata. The data store 212 can receive the request from a content editor 206. The flow continues at block 708.

At block 708, the data store 212 transmits the request and annotation item metadata. In one embodiment, the data store 212 retrieves the requested annotation item metadata from a relational or flat file database and transmits it to a content editor 206. From block 708, the flow ends.

This description of embodiments continues with a discussion of annotation item types. According to embodiments, annotation items can take many forms. In one embodiment, users may want to associate one annotation item to another annotation item. In one embodiment, this can be achieved by tracking the proximity between two annotation tags. For example, if we define an annotation tag "@QUESTION:" for when users want to pose questions in the text of a web page. When someone wants to answer this question, they can inline their answer (i.e., insert the text of their answer directly after the question) and "tag" their answer with an "@ANSWER:" tag. Based on the proximity of the "answer" annotation item to the "question" annotation item, the answer can easily be related to the question. This relationship can be recorded as part of the metadata for the "answer" annotation item and possibly also for the "question" annotation item. This will be particularly useful in relating different annotation items within the same page.

Alternatively, relationships between annotation items can be established without using proximity. For example, relationships may be formed by referring to the annotation identifiers associated with the annotation items. In one embodiment, relationships between annotation items can be established by entering text through the content editor 206, where the text indicates a relationship between items.

In one embodiment users can define annotation item types. Operations for defining annotation item types are described below, in a discussion about FIG. 8.

Figure 8:
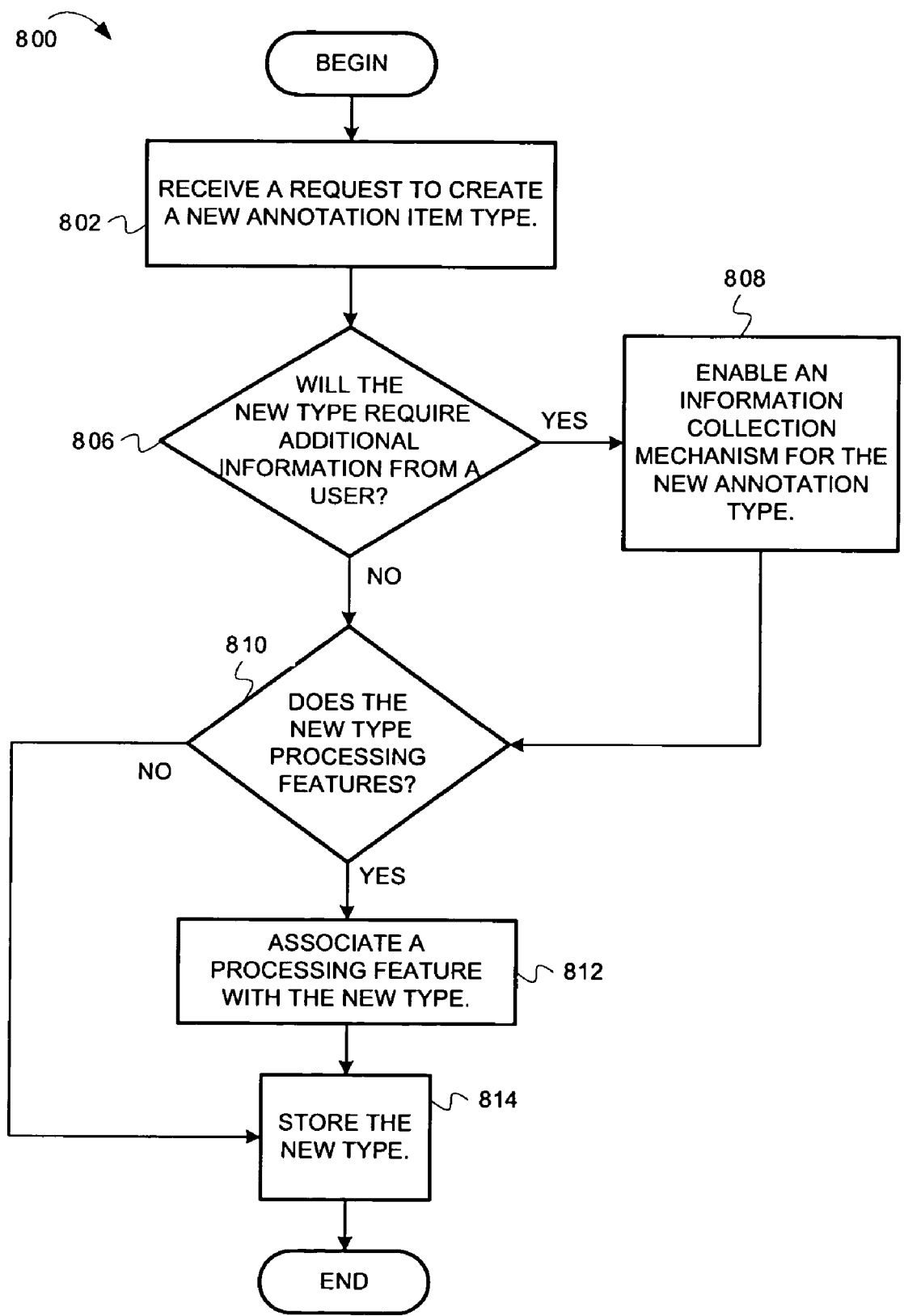
FIG. 8 is a flow diagram illustrating operations for creating a new annotation item type, according to exemplary embodiments of the invention.

FIG. 8 is a flow diagram illustrating operations for creating a new annotation item type, according to exemplary embodiments of the invention. The operations of the flow diagram 800 will be described with reference to the exemplary system of FIG. 2. The flow diagram 800 commences at block 802.

At block 802, the CMS 210 receives a request to create a new annotation item type. The request may be received from a content editor 206. The flow continues at block 806.

At block 806, the CMS determines whether to the new annotation item type will require additional information. If the new annotation item type will require additional information (e.g., a task deadline), the flow continues at block 808. Otherwise, the flow continues at block 810.

At block 808, the CMS 210 enables an information collection mechanism to work with the new annotation item type. In one embodiment, the CMS 210 enables a user interface to collect information associated with the new annotation item type. The flow continues at block 810.

At block 810, the CMS 210 determines whether the new annotation item type requires additional processing features. For example, the CMS 210 determines whether a content editor will need one or more plug-ins for presenting the new annotation type. The flow continues at block 812.

At block 812, the CMS 210 associates the additional processing features with the new annotation item type. In one embodiment, the CMS 210 creates a metadata template for each annotation item type. The CMS 210 can associate the processing features with new annotation items by adding to the template metadata that indicates a set of needed processing features. When content editors receive annotation items of the new type, the metadata will indicate any needed processing features. The flow continues at block 814.

At block 814, the CMS 210 stores the new annotation item type in the data store 212. From block 814, the flow ends.

In addition to performing operations for creating new annotation types, the CMS 210 can search the data store 212 for web pages or metadata. In one embodiment, the CMS 210 can search metadata to determine relationships about the web content. For example, the CMS 210 can search the metadata to determine what web content includes annotation items created by a particular user or what web content includes annotation items that have upcoming deadlines. Based on the metadata search results, the CMS 210 can create content that reports the metadata search results and includes links to web content meeting the given criteria. The description of FIG. 9 below discusses these concepts.

Figure 9:
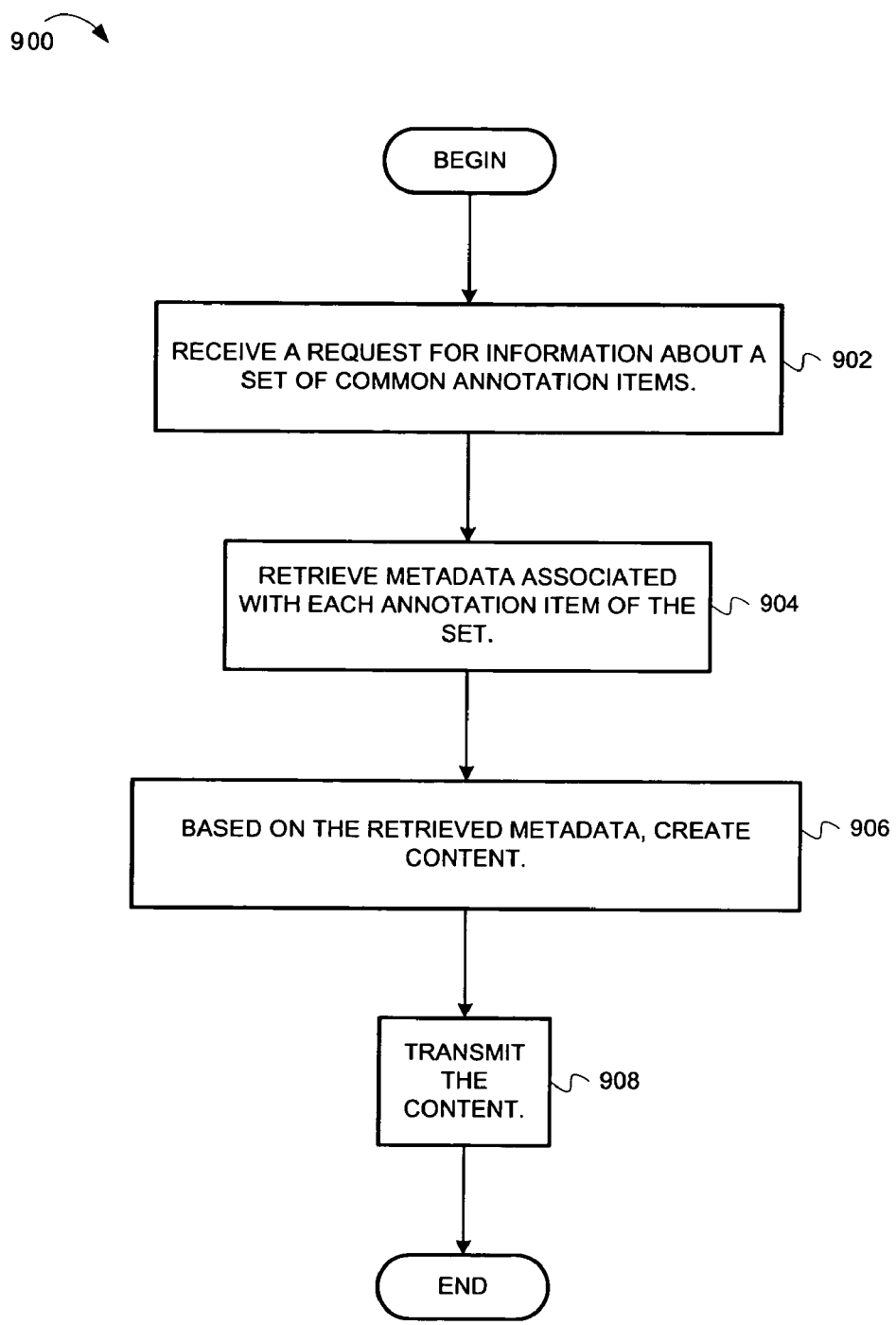
FIG. 9 is a flow diagram illustrating operations for using the metadata for determining relationships among web pages, according to exemplary embodiments of the invention.

FIG. 9 is a flow diagram illustrating operations for using the metadata for determining relationships among web pages, according to exemplary embodiments of the invention. The operations of the flow diagram 900 will be described with reference to the exemplary system of FIG. 2. The flow diagram 900 commences at block 902.

At block 902, the CMS 210 receives from the content editor 206 a request for information about a set of common annotation items. For example, the CMS 210 receives a request for all annotation items associated with a particular user. The request can ask for annotation items having any relationship represented in the metadata. The flow continues at block 904.

At block 904, the CMS 210 searches the metadata for the annotation items of the set. For example, in response to a request from the CMS 210, the data store 212 searches its metadata for all annotation items associated with a particular user. The data store 212 transmits to the CMS 210 all annotation item metadata associated with the particular user. The flow continues at block 906.

At block 906, based on the retrieved metadata, the CMS 210 creates content representing the common annotation items. The content can be a web page or other material presentable by a content editor 206. In one embodiment, the content includes links (e.g., URLs) to web pages that include the common annotation items. The flow continues at block 908.

At block 908, the CMS 210 transmits the content to the content editor 206. The content editor 206 can present the content to a user. From block 908, the flow ends.

General

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "exemplary embodiment" means that the embodiment being referred to serves as an example or illustration.

Herein, block diagrams illustrate exemplary embodiments of the invention. Also herein, flow diagrams illustrate operations of the exemplary embodiments of the invention. The operations of the flow diagrams are described with reference to the exemplary embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel.

The invention claimed is:

1. A computer-implemented method including:
   receiving a request to store a content of a webpage, wherein the webpage includes an annotation tag which indicates that the content of the webpage includes an annotation;
   associating a first set of metadata with the annotation tag, wherein the metadata is distinct from the annotation;
   storing the content of the webpage;
   storing the first set of metadata, and
   accessing the first set of metadata without accessing the content of the webpage.

2. The computer-implemented method of claim 1, further including:
   based on a type of the annotation tag, determining that a second set of metadata is needed;
   collecting the second set of metadata; and
   adding the second set of metadata to the first set of metadata.

3. The computer-implemented method of claim 2, wherein the collecting includes:
   presenting a graphical user interface through which a user can enter information related to the annotation tag;
   receiving the information through the graphical user interface; and
   based on the information, creating the second set of metadata.

4. The computer-implemented method of claim 1, further including:
   associating an annotation identifier with the annotation tag; and
   inserting the annotation identifier into the content.

5. The computer-implemented method of claim 1, further including:
   invoking a set of processing functions based on a type of the annotation tag.

6. The computer-implemented method of claim 1, wherein the first set of metadata includes information about an author of the annotation item, information about the annotation item's location with the web page, or information about a time the annotation item was inserted into the web page.

7. A computer-readable medium that provides instructions, which when executed by a computer, cause the computer to perform a method according to claim 1.

8. A computer-implemented method including:
  receiving, from a requestor, a request for content of a webpage, wherein the content of the webpage includes an annotation tag that is associated with metadata, and wherein the metadata is retrievable without searching the content;
  retrieving the content of the webpage;
  retrieving the metadata, wherein the metadata is distinct from the annotation tag;
  based on the metadata, determining that the content should be modified;
  modifying the content; and
  transmitting the content to the requestor.

9. The computer-implemented method of claim 8, wherein the annotation tag indicates a task to be performed by a designated date.

10. The computer-implemented method of claim 8, wherein the determining is based on a type of the annotation tag.

11. The computer-implemented method of claim 10, wherein the type is associated with a set of one or more rules for processing annotation tags of the type.

12. A computer-readable medium that provides instructions, which when executed by a computer, cause the computer to perform a method according to claim 8.

13. A computer-implemented apparatus including:
  means for receiving a request to store content of a webpage, wherein the webpage includes an annotation tag which indicates that the content of the webpage includes an annotation associated with the annotation tag;
  means for associating a first set of metadata with the annotation tag, wherein the metadata is distinct from the annotation;
  means for storing the content of the webpage;
  means storing the first set of metadata, and
  means for accessing the first set of metadata without accessing the content of the webpage.

14. The computer-implemented apparatus of claim 13, further including:
  means for determining, based on a type of the annotation tag, that a second set of metadata is needed;
  means for collecting the second set of metadata; and
  means for adding the second set of metadata to the first set of metadata.

15. The computer-implemented apparatus of claim 14, wherein the means for collecting includes:
  means for presenting a graphical user interface through which a user can enter information related to the annotation tag;
  means for receiving the information through the graphical user interface; and
  means for creating, based on the information, the second set of metadata.

* * * * *

UNITED STATES PATENT AND TRADEMARK OFFICE
CERTIFICATE OF CORRECTION

PATENT NO. : 7,421,448 B2  Page 1 of 1
APPLICATION NO. : 11/018110
DATED : September 2, 2008
INVENTOR(S) : Spork It is certified that error appears in the above-identified patent and that said Letters Patent is hereby corrected as shown below:

In column 12, line 7, in Claim 13, before "storing" insert -- for --.

Signed and Sealed this

Tenth Day of February, 2009

JOHN DOLL
*Acting Director of the United States Patent and Trademark Office*